(12) United States Patent
Sun et al.

(10) Patent No.: US 9,996,693 B2
(45) Date of Patent: Jun. 12, 2018

(54) AUTOMATED MALWARE SIGNATURE GENERATION

(75) Inventors: Ning Sun, Bellevue, WA (US); Patrick Winkler, Redmond, WA (US); Chengyun Chu, Redmond, WA (US); Hong Jia, Redmond, WA (US); Jason Geffner, Bothell, WA (US); Tony Lee, Sammamish, WA (US); Jigar Mody, Bellevue, WA (US); Frank Swiderski, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 13/486,518

(22) Filed: Jun. 1, 2012

(65) Prior Publication Data
US 2012/0260343 A1 Oct. 11, 2012

Related U.S. Application Data

(63) Continuation of application No. 11/523,199, filed on Sep. 19, 2006, now Pat. No. 8,201,244.

(51) Int. Cl.
*G06F 12/14* (2006.01)
*G06F 21/56* (2013.01)

(52) U.S. Cl.
CPC .......... *G06F 21/566* (2013.01); *G06F 21/564* (2013.01)

(58) Field of Classification Search
CPC ........ G06F 21/53; G06F 21/56; G06F 21/121; G06F 21/561; G06F 21/564; G06F 21/566; H04L 63/14; H04L 29/06911
USPC .................................................... 726/22-24
See application file for complete search history.

(56) References Cited

U.S. PATENT DOCUMENTS

| | | | |
|---|---|---|---|
| 5,819,094 A * | 10/1998 | Sato et al. | ..................... 717/131 |
| 6,338,141 B1 | 1/2002 | Wells | |
| 6,663,000 B1 | 12/2003 | Muttik et al. | |
| 6,711,583 B2 | 3/2004 | Chess et al. | |
| 7,065,790 B1 | 6/2006 | Gryaznov | |
| 7,103,913 B2 | 9/2006 | Arnold et al. | |
| 7,398,553 B1 | 7/2008 | Li | |
| 7,640,583 B1 | 12/2009 | Marinescu et al. | |
| 7,664,754 B2 * | 2/2010 | Shipp | .............................. 726/24 |
| 7,694,150 B1 | 4/2010 | Kirby | |
| 7,809,670 B2 * | 10/2010 | Lee et al. | ........................ 706/59 |

(Continued)

OTHER PUBLICATIONS

Park et al, A Similarity Based Technique for Detecting Malicious Executable Files for Computer Forensics, 2006, IEEE, pp. 188-193.*

(Continued)

*Primary Examiner* — James Turchen
*Assistant Examiner* — Jenise Jackson
(74) *Attorney, Agent, or Firm* — Fiala & Weaver P.L.L.C.

(57) ABSTRACT

Automated malware signature generation is disclosed. Automated malware signature generation includes monitoring incoming unknown files for the presence of malware and analyzing the incoming unknown files based on both a plurality of classifiers of file behavior and a plurality of classifiers of file content. An incoming file is classified as having a particular malware classification based on the analyzing of incoming unknown files and a malware signature is generated for the incoming unknown file based on the particular malware classification. Access is provided to the malware signature.

20 Claims, 5 Drawing Sheets

(56) References Cited

U.S. PATENT DOCUMENTS

| | | | |
|---|---|---|---|
| 8,161,548 B1* | 4/2012 | Wan | 726/22 |
| 8,392,994 B2* | 3/2013 | Spurlock et al. | 726/24 |
| 8,719,924 B1* | 5/2014 | Williamson | G06F 21/568 713/188 |
| 2002/0073055 A1 | 6/2002 | Chess et al. | |
| 2003/0065926 A1 | 4/2003 | Schultz et al. | |
| 2003/0070088 A1 | 4/2003 | Gryaznov | |
| 2003/0074581 A1 | 4/2003 | Hursey et al. | |
| 2003/0120951 A1 | 6/2003 | Gartside et al. | |
| 2004/0015712 A1* | 1/2004 | Szor | G06F 21/566 726/24 |
| 2004/0111708 A1* | 6/2004 | Calder et al. | 717/131 |
| 2004/0133796 A1* | 7/2004 | Cohen | G06F 21/566 726/24 |
| 2004/0181677 A1 | 9/2004 | Hong et al. | |
| 2004/0236884 A1 | 11/2004 | Beetz | |
| 2005/0021994 A1 | 1/2005 | Barton et al. | |
| 2005/0022172 A1* | 1/2005 | Howard | G06F 21/52 717/136 |
| 2005/0027686 A1 | 2/2005 | Shipp | |
| 2005/0071649 A1 | 3/2005 | Shipp | |
| 2005/0080816 A1 | 4/2005 | Shipp | |
| 2005/0120239 A1 | 6/2005 | Monroe et al. | |
| 2005/0154738 A1 | 7/2005 | Thomas et al. | |
| 2005/0172338 A1 | 8/2005 | Sandu et al. | |
| 2005/0177736 A1* | 8/2005 | de los Santos | G06F 21/564 713/188 |
| 2005/0177752 A1 | 8/2005 | Hollander et al. | |
| 2005/0223238 A1* | 10/2005 | Schmid | G06F 21/563 713/188 |
| 2005/0229254 A1 | 10/2005 | Singh et al. | |
| 2005/0262567 A1* | 11/2005 | Carmona | G06F 21/564 726/24 |
| 2006/0021029 A1* | 1/2006 | Brickell et al. | 726/22 |
| 2006/0026675 A1 | 2/2006 | Cai et al. | |
| 2006/0037080 A1 | 2/2006 | Maloof | |
| 2006/0106838 A1 | 5/2006 | Ayediran et al. | |
| 2006/0130141 A1 | 6/2006 | Kramer et al. | |
| 2006/0130144 A1 | 6/2006 | Wernicke | |
| 2006/0230288 A1* | 10/2006 | Fox et al. | 713/188 |
| 2006/0230452 A1 | 10/2006 | Field | |
| 2006/0288415 A1* | 12/2006 | Wong | 726/24 |
| 2007/0056035 A1* | 3/2007 | Copley | G06F 21/566 726/22 |
| 2007/0067844 A1 | 3/2007 | Williamson et al. | |
| 2007/0089171 A1* | 4/2007 | Aharon et al. | 726/22 |
| 2007/0094734 A1* | 4/2007 | Mangione-Smith et al. | 726/24 |
| 2007/0136455 A1* | 6/2007 | Lee et al. | 709/223 |
| 2007/0214267 A1* | 9/2007 | Ogura et al. | 709/226 |
| 2007/0240217 A1 | 10/2007 | Tuvell et al. | |
| 2007/0240222 A1* | 10/2007 | Tuvell et al. | 726/24 |
| 2007/0294391 A1* | 12/2007 | Kohn | 709/224 |
| 2008/0005782 A1 | 1/2008 | Aziz | |
| 2008/0010538 A1* | 1/2008 | Satish | G06F 21/562 714/38.13 |
| 2008/0016339 A1* | 1/2008 | Shukla | 713/164 |
| 2008/0141286 A1 | 6/2008 | Marinescu | |
| 2008/0313459 A1 | 12/2008 | Kwan | |
| 2009/0187992 A1* | 7/2009 | Poston | 726/24 |
| 2010/0054278 A1 | 3/2010 | Stolfo et al. | |
| 2010/0095379 A1* | 4/2010 | Obrecht et al. | 726/23 |
| 2010/0275034 A1* | 10/2010 | Safa | G06F 21/125 713/189 |
| 2011/0067109 A1* | 3/2011 | Costea | G06F 21/564 726/24 |
| 2011/0093951 A1 | 4/2011 | Aziz | |
| 2011/0179484 A1 | 7/2011 | Tuvell et al. | |
| 2011/0179491 A1* | 7/2011 | Spurlock et al. | 726/24 |
| 2012/0192279 A1* | 7/2012 | Muttik et al. | 726/24 |
| 2012/0198552 A1* | 8/2012 | Alagna et al. | 726/23 |
| 2012/0246721 A1* | 9/2012 | Viljoen | G06F 21/56 726/22 |
| 2012/0278895 A1* | 11/2012 | Morris | G06F 21/577 726/24 |
| 2013/0347115 A1* | 12/2013 | Field | G06F 21/562 726/24 |
| 2016/0378985 A1* | 12/2016 | Niemela | G06F 21/566 726/24 |
| 2017/0187684 A1* | 6/2017 | Fossen | G06F 21/562 |

OTHER PUBLICATIONS

Jaeger et al, Policy Management Using Access Control Spaces, ACM, Aug. 2003, vol. 6, No. 3, pp. 327-364.*

Karim, et al., "Malware Phylogeny Generation using Permutations of Code", Accepted to European Research Journal of Computer Virology (2005, to appear) pp. 1-14, 2005, http://www.cacs.louisiana.edu/~arun/papers/phylogeny-erjocv2005-preprint.pdf.

Kolter, et al., "Learning to Detect Malicious Executables in the Wild", KDD'04, Aug. 22-25, 2004, Seattle, Washington, USA. Copyright 2004 ACM, pp. 470-478, http://portal.acm.org/citation.cfm?id=1014052.1014105.

Sung, et al., "Static Analyzer of Vicious Executables (SAVE)", pp. 1-9, 2004, http://www.acsac.org/2004/papers/79.pdf.

Non-Final Office Action cited in related U.S. Appl. No. 11/523,199 dated Sep. 9, 2009.

Response to Non-Final Office Action cited in related U.S. Appl. No. 11/523,199, filed Dec. 9, 2009.

Final Office Action cited in related U.S. Appl. No. 11/523,199 dated Mar. 31, 2010.

Response to Final Office Action cited in related U.S. Appl. No. 11/523,199, filed Jun. 1, 2010.

Non-Final Office Action cited in related U.S. Appl. No. 11/523,199 dated Sep. 28, 2010.

Response to Non-Final Office Action cited in related U.S. Appl. No. 11/523,199, filed Dec. 28, 2010.

Final Office Action cited in related U.S. Appl. No. 11/523,199 dated Mar. 21, 2011.

Response to Final Office Action cited in related U.S. Appl. No. 11/523,199, filed Jun. 21, 2011.

Notice of Allowance cited in related U.S. Appl. No. 11/523,199 dated Feb. 14, 2012.

* cited by examiner

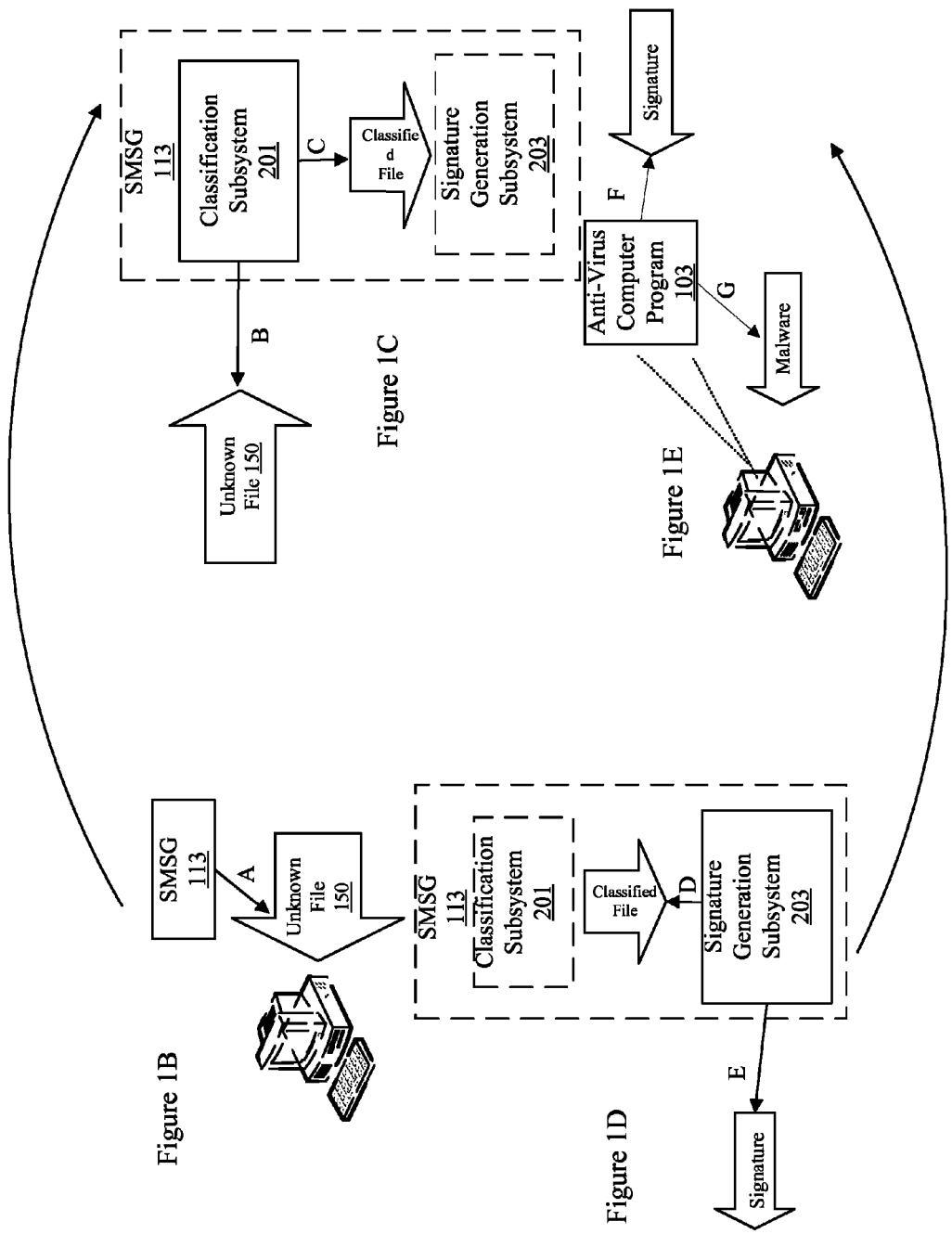

AUTOMATED MALWARE SIGNATURE GENERATION

RELATED APPLICATION

This application is a continuation of U.S. application Ser. No. 11/523,199, filed on Sep. 19, 2006, entitled "AUTOMATED MALWARE SIGNATURE GENERATION," at least some of which may be incorporated herein.

BACKGROUND

In a typical computer network, computer systems are coupled to the network in a manner that allows the computer systems to access data from a variety of sources of information. Data accessed by such network coupled computer systems can be provided by internal, directly coupled and remote sources of information. Unfortunately, the data accessed from such sources of information can include malicious software that is designed to infiltrate and/or damage the computer system. Such malicious software is called "malware."

Malware as used herein can include but is not limited to computer viruses, worms, trojan horses, spyware and some adware. For reasons that are apparent, malware operates without the informed consent of computer system owners. Indeed, malware can be designed to thwart computer system software (or hardware) that is installed as a defense against active malware. An example of conventional computer system software that can be installed as such a defense against the threat of malware can include antivirus programs.

The proliferation of malware is currently increasing at an accelerated rate. This is because the "barriers to entry" for designers of malware (the challenges that need to be overcome for designers of malware to produce new malware versions) are lower than ever. This process has been abetted by the availability of very high quality software development kits that can provide even neophyte malware designers with the capacity to create dangerous new malware variants. Some of these kits enable a malware designer to recompile a malware source code with minor source code modifications so as to develop malware that can avoid detection. The new malware versions have a significant semantic resemblance to previous versions and thus present a similar threat.

In fact, many of the newly appearing malware files are malware variants that belong to a few very active existing malware families such as Bots. When compiled, source code associated with such malware variants that include source code level changes such as discussed above, can be compiled to the same functions as the previous malware versions even though the underlying binary code is different (corresponding to changes in the source code). These differences in binary code between a malware variant and a previous malware version can cause the detection of the malware variant to be frustrated because the data that is used to identify the previous malware version may not be effective for identifying the malware variant.

A conventional approach to identifying malware variants is the use (e.g., as a part of or in conjunction with an antivirus program) of generic malware signatures. A generic signature can be extracted by researchers from malware code and used to identify malware from malware families. These signatures can be stored and compared with incoming files to facilitate the identification.

Generic signatures only guard against general malware types and may not be very effective against particular malware variants such as discussed above. While generic signatures can partially address the problem of combating certain active malware families, their effectiveness is restricted by shortcomings such as performance and accuracy. Antivirus researchers spend a significant amount of time and effort analyzing samples of code from malware and employ a variety of techniques to identify effective signatures. However, this process can be tedious and slow and is very error prone (errors made during the creation of a signature can result in false positive malware identifications). Moreover, this process represents a largely unsatisfactory manual response to an active and dynamically evolving malware threat.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Automated malware signature generation is disclosed. Automated malware signature generation includes monitoring incoming unknown files for the presence of malware and analyzing the incoming unknown files based on both classifiers of file behavior and classifiers of file content. An incoming file is classified as having a particular malware classification. Subsequently, a malware signature is generated for the incoming unknown file based on the particular malware classification. This malware signature can be used by an anti-virus program as a part of the anti-virus program's virus identification processes.

BRIEF DESCRIPTION OF THE DRAWINGS

The accompanying drawings, which are incorporated in and form a part of this specification, illustrate embodiments and, together with the description, serve to explain the principles of the embodiments:

FIG. 1B illustrates an operation of an SMSG according to one embodiment.

FIG. 1C illustrates an operation of an SMSG according to one embodiment.

FIG. 1D illustrates an operation of an SMSG according to one embodiment.

FIG. 1E illustrates an operation of an SMSG according to one embodiment.

The drawings referred to in this description should not be understood as being drawn to scale except if specifically noted.

DETAILED DESCRIPTION

Reference will now be made in detail to various embodiments, examples of which are illustrated in the accompanying drawings. While embodiments will be described herein, it will be understood that these descriptions are not intended to limit the disclosed subject matter to specific embodiments. On the contrary, the embodiments are intended to cover alternatives, modifications and equivalents, which may be included within the spirit and scope of the subject matter disclosed herein as defined by the appended claims. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1A:
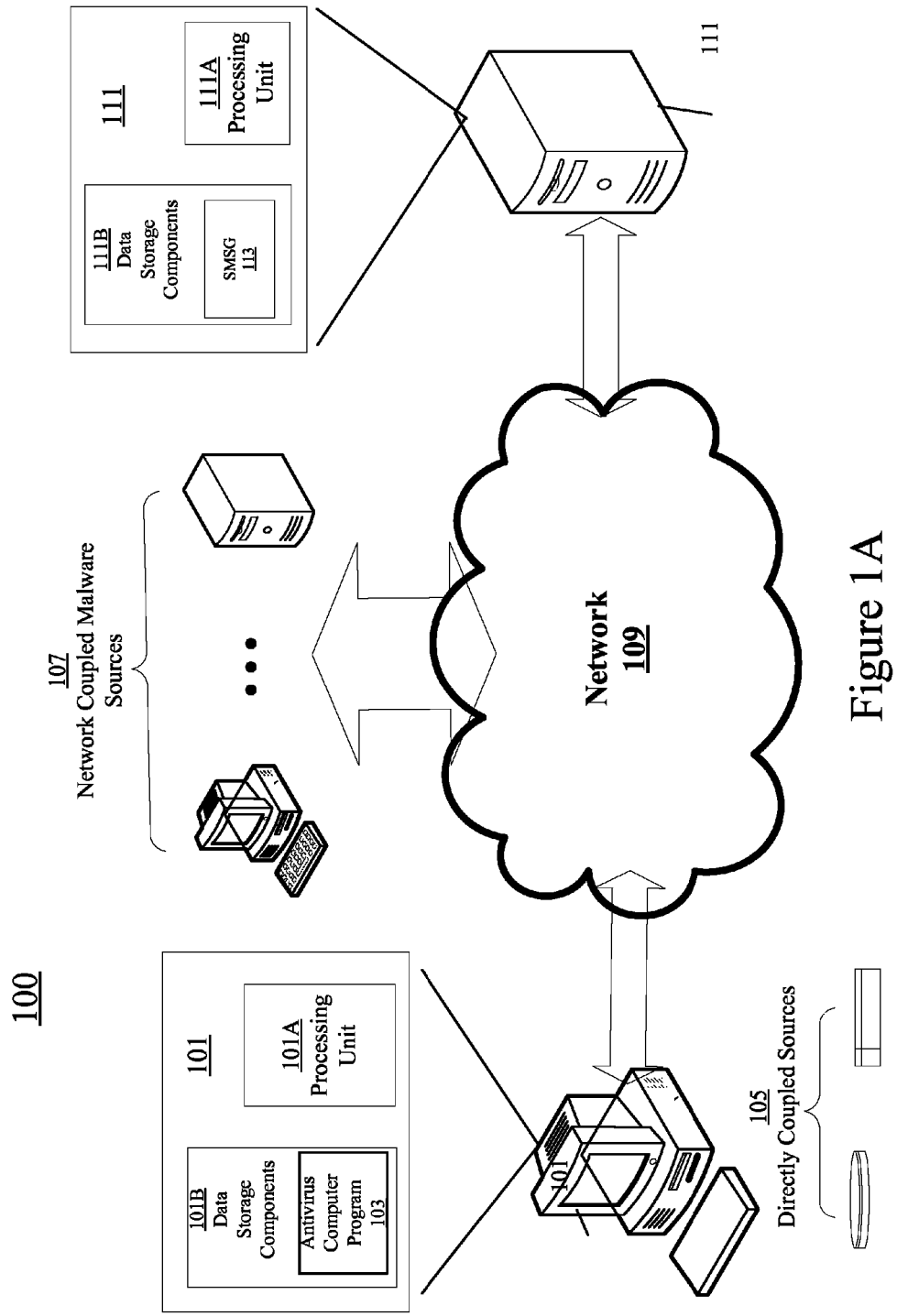
FIG. 1A shows an exemplary operating environment of a system for automated malware signature generation (SMSG) according to one embodiment.

Exemplary Operating Environment of System for Automated Malware Signature Generation According to Embodiments FIG. 1A shows an exemplary operating environment 100 of a system 113 for automated malware signature generation (SMSG) according to one embodiment. It should be appreciated that SMSG 113 provides an automated response to evolving malware threats to computer systems. In one embodiment, SMSG 113 responds to unknown incoming files by generating a signature for them that can be used by an antivirus program as a part of the anti-virus program's virus identification processes. FIG. 1A shows client 101, antivirus computer program 103, directly coupled virus sources 105, network coupled virus sources 107, network 109, server 111 and SMSG 113. It should be appreciated that antivirus computer program 103 and SMSG 113 are shown as residing in data storage components of client 101 and server 111 respectively. The structure of these computer systems are discussed in detail below.

Referring to FIG. 1A, client 101 can encompass a computer system and one or more computer programs that execute on the computer system. In one embodiment, the one or more computer programs that execute on client 101 can operate as requesting programs in the client-server network illustrated in FIG. 1A. It should be appreciated that client 101 can be threatened by malware from sources that can include but are not limited to directly coupled virus sources 105 and network coupled virus sources 107. In one embodiment, an antivirus computer program (e.g., 103) for responding to such malware threats, can execute on client 101 or can execute at a location that is remote from client 101.

In the FIG. 1A embodiment, client 101 is coupled to server 111 via network 109. Moreover, SMSG 113 is resident at server 111 and monitors the incoming unknown files that are received by client 101 (see FIG. 1B). In one embodiment, antivirus computer program 103 can access malware signatures (for malware identification purposes) generated by SMSG 113, as shown in FIG. 1E, that can assist in the aforementioned virus combating operations.

Referring again to FIG. 1A, server 111 is communicatively coupled to client 101 as a backend provider of services to client 101 (and it's users). As discussed above, in one embodiment, SMSG 113 executes on server 111 and monitors incoming unknown files that are received by client 101 for the presence of malware. SMSG 113 classifies the incoming unknown files and generates a signature for incoming unknown files that are identified as belonging to a particular malware family as is discussed in detail herein (see discussion made with reference to FIG. 2B). In one embodiment, SMSG 113 employs a plurality of both behavior and content related analyses to classify an incoming unknown file. Subsequently, a signature from the newly classified incoming unknown file can be extracted and validated for access by client 101 (see discussion made with reference to FIGS. 1B-1E below).

In one embodiment, SMSG 113 can execute on either server 111 or client 101. In an alternate embodiment, some components of SMSG 113 can execute on client 101 and other components of SMSG 113 can execute on server 111. In yet another embodiment, SMSG 113, or components thereof, can execute remotely from either or both server 111 and client 101.

Operation of System for Automated Malware Signature Generation

FIGS. 1B-1E illustrate the operation of SMSG 113 according to one embodiment. In FIGS. 1B-1E, exemplary operations A-G are illustrated. It should be appreciated that these illustrations are provided for purposes of clarity and brevity. However, other operations not shown in FIGS. 1B-1E can be performed in accordance with one embodiment.

Referring to FIG. 1B, in operation, incoming unknown files 150 that are received by client 101 are monitored by SMSG 113 at A. Subsequently, as shown in FIG. 1C, incoming unknown files 150 are accessed by classification subsystem 201 at B. In one embodiment, the incoming unknown files are subjected to a plurality of both functional and content related analyses (as is discussed herein in detail with reference to FIG. 2B) and are classified based on the result of the analyses in accordance with predefined rules. As is shown in FIG. 1C, classification subsystem 201 provides access to the classified file at C.

In one embodiment, classification subsystem 201 can include a classification engine (such as is discussed herein in detail with reference to FIG. 2B) that can be employed to elicit information from analyzer related databases (also discussed herein with reference to FIG. 2B) that can be employed in the classification of the unknown files as malware.

As illustrated in FIG. 1D, after an unknown file 150 has been classified, the newly classified file can be accessed, as is shown at D, by signature generation subsystem 203. In one embodiment, signature generation subsystem 203 can extract a signature from the newly classified file and can subsequently provide access to the extracted signature (such as to an antivirus computer program) as shown at E. In one embodiment, the signature can be stored in a signature database for use in antivirus operations. As illustrated in FIG. 1E, the signature can be accessed (either from SMSG 113 or from the signature database) by an antivirus computer program (e.g., 103 in FIG. 1A) such as is shown at F and used to identify malware as is shown at G.

It should be appreciated that each of the malware signatures that are generated can be validated to avoid false positives. As is described in detail herein with reference to FIG. 2B, in one embodiment, signature generation subsystem 203 can access information from certain databases (described herein with reference to FIG. 2B) to validate a generated malware signature before the signature is provided to an antivirus program (e.g., 103 in FIG. 1A).

In one embodiment, the type of signature that is extracted from a malware file can be based on malware type and/or family. In addition, the signature can be structured based on rules that are specified beforehand for the type of signature to be generated. In one embodiment, a signature generator can generate one or more signatures for a given malware file (see discussion of the signature generator made herein with reference to FIG. 2B).

Exemplary Advantages

An advantage of the automated generation of malware signatures for unknown files that can be classified as variants of known malware such as is described herein is that the level of responsiveness provided by the automated generation of malware signatures presents an effective line of protection against such malware variants. Moreover, systems for automated generation of malware signatures can be encompassed by a machine aided system which is capable of classifying new malware variants and automatically generating effective signatures that can save time and labor and lower service cost while maintaining consistent quality for antivirus products.

It should be appreciated that exemplary embodiments accommodate the pushing of SMSG 113 into client protection systems (e.g., antivirus computer program 103). For example, SMSG 113 can be pushed into currently available active antivirus protection products such as malware behavior blocking products. In this manner, such products can be made more effective as not only behavior analysis but various other type analyses can be correlated by specified rules and thereby imparted to improve the accuracy of such products.

It should be appreciated that using rules for unknown file classification and malware signature extraction allows SMSG 113 to adapt quickly to evolving threats. For example, if a new malware file is encountered, a new set of rules can be quickly pushed from a server (e.g., 111) to a client (e.g., 101) to combat the new malware threat so as to protect the client (e.g., 101). Rules can be specified in a variety of formats that include but is not limited to XML.

Exemplary Computer Systems and Computer Readable Media

In the FIG. 1A embodiment, client 101, network coupled malware sources 107 and server 111 can encompass computer systems that include at least one processing unit (e.g., 101A, 111A etc.) and data storage components (e.g., 101B, 111B etc.) wherein one or more computer programs reside (e.g., 103, 113). It should be appreciated that depending on the computer system configuration and type, data storage components (computer readable media) can include volatile (such as RAM) and/or non-volatile (such as ROM, flash memory, etc.) components. Other data storage components that can be a part of the computer systems include but are not limited to CD-ROM, DVD or other optical storage, magnetic cassettes, magnetic tape, magnetic disk storage or other magnetic storage devices, or any other medium which can be used to store the desired information and which can be accessed.

Similarly, the computer systems (e.g., 103, 107 and 111, etc) can also include input devices and output devices (not shown). Moreover, the computer systems can include network connections to other devices, computers, networks, servers, etc. using either wired or wireless media. All these devices are well known in the art and need not be discussed here at length.

Although computer systems may be shown and described in the FIG. 1A embodiment as having certain numbers and types of elements, embodiments are not limited to the implementation shown in FIG. 1A. That is, a computer system can include elements other than those shown in FIG. 1A. Moreover, a computer system can include more than one of each of the elements that are shown in FIG. 1A.

It should also be noted that the computer systems can possess a variety of forms. For example, a client (e.g., 101) computer system can be but is not limited to being a personal desktop computer, a portable notebook computer, a personal digital assistant (PDA), and a gaming system.

Figure 2A:
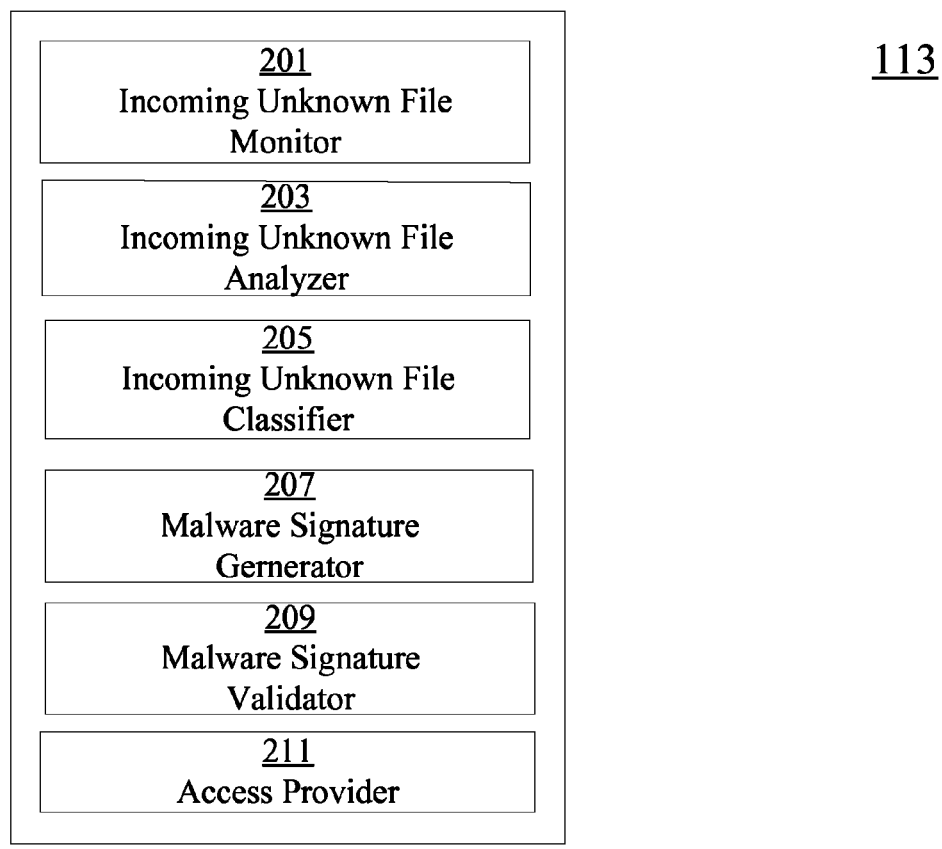
FIG. 2A shows components of a system for automated malware signature generation (SMSG) according to one embodiment.

Components of System for Automated Malware Signature Generation According to Embodiments FIG. 2A shows components of a system 113 for automated malware signature generation (SMSG) according to one embodiment. It should be appreciated that SMSG 113 provides an automated response to evolving malware threats to computer systems as discussed above. In one embodiment, also as discussed above, SMSG 113 responds to unknown incoming files by generating a signature for them that can be used by an antivirus program as a part of the antivirus program's virus identification processes. In the FIG. 2A embodiment, components of SMSG 113 include incoming unknown file monitor 201, incoming unknown file analyzer 203, incoming unknown file classifier 205, malware signature generator 207, malware signature validator 209 and access provider 211.

It should be appreciated that aforementioned components of SMSG 113 can be implemented in hardware or software or in a combination of both. In one embodiment, components and operations of SMSG 113 can be encompassed by components and operations of a computer program that executes on a server. In another embodiment, components and operations of SMSG 113 can be separate from the aforementioned computer program but can operate cooperatively with components and operations thereof.

Referring to FIG. 2A, incoming unknown file monitor 201 monitors a client system's (e.g., 101 in FIG. 1A) incoming unknown files for the presence of malware. In one embodiment, incoming unknown files can be accessed from directly coupled and/or network coupled sources. In one embodiment, upon the detection of incoming unknown files the incoming unknown files can be accessed by incoming unknown file analyzer 203.

Incoming unknown file analyzer 203 generates data related to both file behavior and file content. In one embodiment, incoming unknown file analyzer 203 subjects the incoming unknown file to a plurality of types of analysis (see FIG. 2B discussion) that generates data related to file behavior and content that can be used by incoming unknown file classifier 205 to provide a highly reliable classification.

Incoming unknown file classifier 205 identifies an incoming file as having a particular malware classification. In one embodiment, the identification is based on the aforementioned analysis of incoming unknown files and predefined rules. In one embodiment, unknown file classifier 205 can encompass a rule based algorithm that receives, as input, data that is generated as a part of the aforementioned analysis of incoming unknown files and provides, as an output, a highly reliable classification.

Malware signature generator 207 generates a malware signature for the aforementioned incoming unknown files identified as including malware. In one embodiment, the malware signature can be based on the aforementioned malware classification of the incoming unknown file and predefined rules for a file having the determined classification. In one embodiment, malware signature generator 207 can generate the malware signature using signature extraction.

In one embodiment, as alluded to above, the type of signature that is extracted from a malware file can be based on malware type and/or family. In addition, the signature can be based on rules that are specified beforehand for the type of signature to be generated. In one embodiment, a signature generator can generate one or more signatures for a given malware file (see discussion of the signature generator made herein with reference to FIG. 2B).

Malware signature validator 209 validates generated malware signatures. In one embodiment, malware signature validator 209 validates generated malware signatures before access is provided to the generated malware signature. In one embodiment, the malware signature is validated to avoid "false positives" when the malware signature is subsequently used (such as by and antivirus program) in the identification of malware. In one embodiment, information can be accessed (such as from a database) and used to validate a generated malware signature before the signature is provided to an antivirus program (e.g., 103 in FIG. 1A).

Access provider 211 provides access to a generated malware signature. In one embodiment, access is provided by transmitting the malware signature to a client system (e.g., 101 in FIG. 1A). In another embodiment, access is provided by allowing the malware signature to be retrieved by a client system.

Figure 2B:
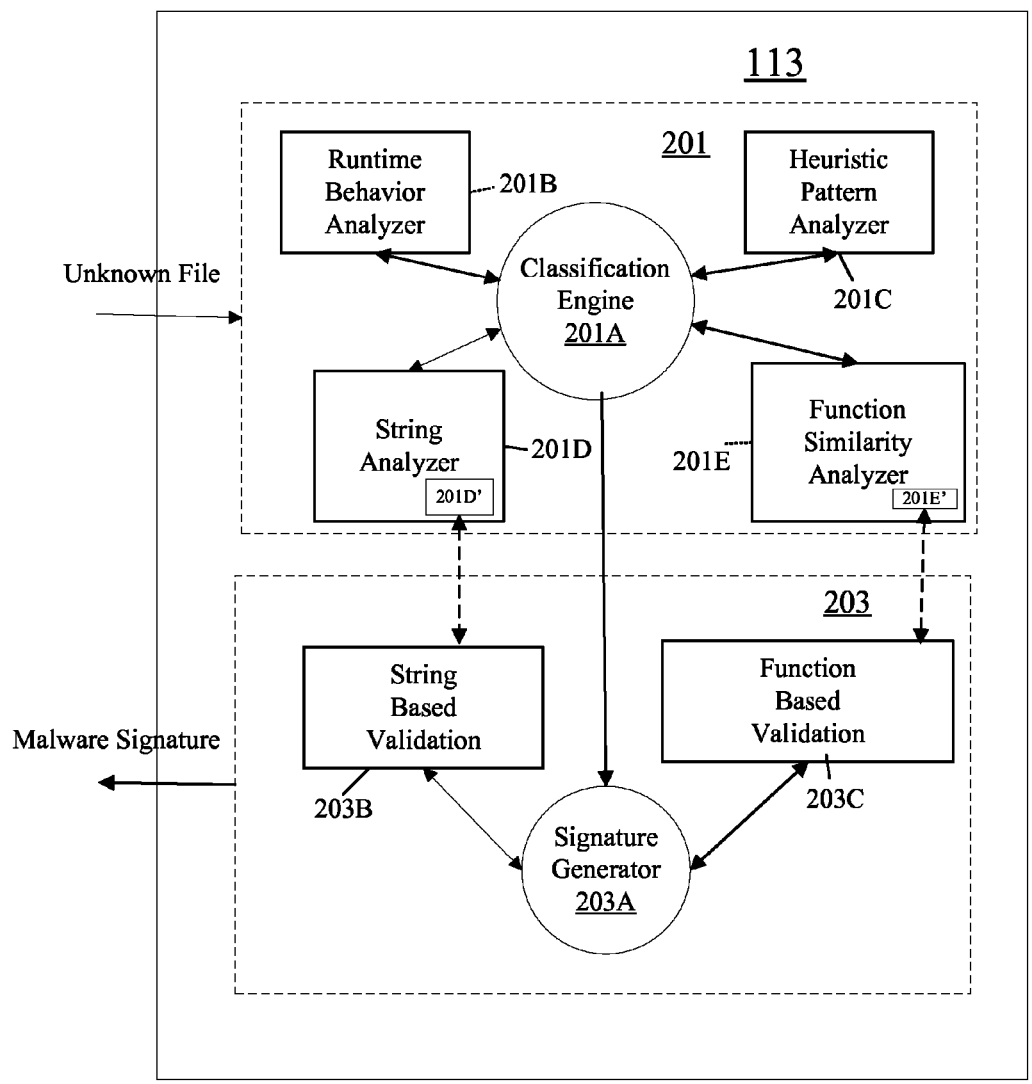
FIG. 2B shows an implementation of an SMGS according to one embodiment.

Exemplary Implementation of System for Automated Malware Signature Generation According to Embodiments FIG. 2B shows an implementation 200 of an SMGS (e.g., 113 in FIG. 1A) according to one embodiment of the present invention. In the FIG. 2B embodiment, SMGS 113 includes rule-based classification subsystem 201 and rule-based signature generation subsystem 203. In the FIG. 2B embodiment, rule-based classification subsystem 201 includes classification engine 201A, runtime behavior analyzer 201B, heuristic pattern analyzer 201C, string analyzer 201D and function similarity analyzer 201E. In the FIG. 2B embodiment, rule-based signature generation subsystem includes signature generator 203A, string based validation component 203B and function based validation component 203C. It should be appreciated that the information that is provided by the various system components is correlated based on predefined rules so as to generate a reliable signature that is validated using a plurality of types of validation techniques.

Referring to FIG. 2B, runtime behavior analyzer 201B monitors the environment (e.g., a controlled environment) in which unknown files run and logs the behavior of the unknown files in execution. In one embodiment, the environment can be a virtual one such as an emulator or a physical one such as an actual computer. In one embodiment, behavior of unknown files that can be logged can include behavior associated with malicious files. Such behavior can include but is not limited to modifications to local machine memory, disk and registry resources, APIs called, attempts to connect to a network, and communications made across the network, etc.

Heuristic pattern analyzer 201C characterizes unknown files based on binary patterns that correspond to patterns of behavior related to known types of malware. For example, a "network worm" that exploits remote vulnerabilities can possess byte sequences that are associated with the establishment of a connection and with the commencement of the exploitation. In one embodiment, detection of characteristics of such binary patterns can be useful such as by comparing them with entries in a heuristic pattern knowledge database as a means of identifying malware threats.

Function similarity analyzer 201E characterizes functions of incoming unknown files by generating a function characteristic value that corresponds to the function. In one embodiment, function similarity analyzer 201E stores the function characteristic value in a knowledge database (e.g., function semantics database). A function can be characterized in many ways (e.g., function, input, output, etc.). It should be appreciated that a purpose of function characterization is to accurately and effectively capture the semantics (meaning) of the function.

In one embodiment, functions can be characterized through the creation of an opcode (code that specifies an operation to be performed) for each instruction of a function to obtain a sequence of opcode bytes. In an alternate embodiment, a function can be characterized through a zeroing out of external information that may not be relevant to operation while retaining most other function information.

In one embodiment, a hash value (a digital fingerprint) can be computed for a characterized function. In one embodiment, hash generating algorithms can include CRC, MD5 or SHA1 type algorithms. In an alternate embodiment, other type hash generating algorithms can be employed.

Referring again to FIG. 2B, function similarity analyzer 201E analyzes disassembled functions of incoming unknown files and compares them to entries in function semantics database 201E'. In one embodiment, function entries can be assigned different weight values which indicate the reliability of the function as an identifier of respective malware families. In one embodiment, for common library functions, weight values can be set to zero so that they may not contribute to classification. Consequently, function semantics database 201E' can be queried to obtain a score that provides a measure of the resemblance of an incoming unknown file to each known malware family variant. In one embodiment, the malware family variant with the top score identifies the family to which the unknown file has the greatest probability of belonging.

It should be appreciated that designers of new malware versions attempt to make minor changes to existing malware source code so that when the source code is compiled it is compiled to the same function as the previous malware version but has binary code changes (that correspond to the changed source code) that causes it's detection to be frustrated. This can be accomplished by recompiling the source code with minor modifications most likely using the same compiler to obtain promising (in the sense that they are likely to avoid detection) malware variants. The new malware files can have a significant semantic resemblance to previous versions.

Although the new malware version and the previous one may not possess a perfect bit to bit match they are semantically identical as they are intended to perform the same function. Moreover, because the analysis of the function similarity analyzer 201E is based on an identification of semantic characteristics of functions of unknown incoming files functions that are similar to functions of known malware families, instead of an exact bit to bit correspondences between such functions, the identification of a malware variant is not frustrated by differences in the underlying binary image of the functions.

It should be appreciated that identifying the semantic characteristics of a function allows these characteristics to be used for family classification as well as for signature generation. In one embodiment, function as used herein can refer to a closed block of code as seen in the assembly code format. In one embodiment, the function can be referenced by a CALL instruction and can end with a RET instruction. In other embodiments, other type functions can be involved in the herein described malware identification processes.

String analyzer 201D characterizes incoming unknown files based on strings (sequences of various simple objects such as printable characters, e.g., email addresses, url, names, etc. and their control codes) that are prevalent in known malware families. In one embodiment, such strings can be collected and associated with respective malware families in string database 201D'. In one embodiment, a classification determination can be made based on a comparison between an unknown file and entries in string database 201D'. In one embodiment, string data can be clustered by malware family in order to facilitate the generation of signatures based on combinations of strings that are specific to given malware families.

It should be appreciated that it is contemplated that additional analysis components, in addition to those shown in FIG. 2B, can be used. In one embodiment, rules can be predefined to specify the manner in which data provided by the analysis components are to be correlated to determine a classification. In one embodiment, classification engine 201A combines and correlates the results from each analysis component according to the predefined rules in order to determine a classification.

As shown in FIG. 2B, data that is generated from the analysis that is provided by runtime behavior analyzer 201B, heuristic pattern analyzer 201C, string analyzer 201D and function similarity analyzer 201E can be supplied to classification engine 201A. In one embodiment, classification engine 201A can employ a rule based algorithm that receives as input the data that is generated from the aforementioned analysis of incoming unknown files and can provide as output a highly reliable malware classification of the unknown file.

In one embodiment, when an unknown file (e.g., target) has been classified, it can be accessed (received after transmission to or retrieved) by signature generator 203A.

Referring again to FIG. 2B, signature generator 203A accesses newly classified files previously classified by classification engine 201A and generates malware signatures for the newly classified files. In one embodiment, a malware signature identifies the particular malware type and family to which an unknown file belongs based on signature generating rules that are predefined according to domain (e.g., file type). In one embodiment, as discussed above, signature generator 203A can generate one or more malware signatures for a given unknown file.

Signature Validation

In one embodiment, each of the malware signatures that are generated can be validated to avoid false positive malware identifications (e.g., when used by an anti-virus program). In one embodiment, the aforementioned string and function semantics (e.g., 201D' and 201E') databases can be employed in the validation of signatures.

In one embodiment, in function semantics database 201E', each function characteristic value can be provided a designation, which can include but is not limited to: (1) good for signature (GFS), (2) not good for signature (NFS), and (3) unknown. In one embodiment, GFS indicates that a function is unique enough to reliably represent some pattern that is associated with certain malware files. It should be appreciated that a GFS function is generally not present in files that are devoid of malware. Consequently, the detection of the presence of such a function in a file is a reliable indicator that the file content may include malware.

If a section of a file from which a signature prospect is extracted contains at least one GFS function, the signature prospect is considered satisfactory for use in virus detection operations (e.g., may not cause false positive malware identifications).

In an alternate embodiment, signatures for NFS functions can be examined in order to identify signatures that are satisfactory for use in virus detection operations. It should be appreciated that NFS functions can be readily identified in files that are devoid of malware. In one embodiment, if a section of a file from which a signature prospect is extracted does not contain an NFS function, or if the NFS function percentage in the section of the file from which a signature prospect is extracted is below an acceptable threshold, the signature can also be considered satisfactory (does not cause false positives).

In one embodiment, the aforementioned malware signature validation techniques can be used in combination with string based malware signature validation techniques in the validation of malware signatures. In one embodiment, string based malware signature validation techniques can involve examining a prospective signature for special strings that are prevalent in certain malware families. In one embodiment, such strings can be predefined in rules for malware signature validation. In one embodiment, a validation decision can be based on a comparison between a generated malware signature and entries in string database 201D'.

In one embodiment, if a malware signature section contains at least one string, then the malware signature is considered satisfactory for use in virus detection operations. It should be appreciated that other malware signature validation techniques in addition to those discussed herein can be employed.

Referring again to FIG. 2B, classification subsystem 201 and/or signature generation subsystem 203 can reside at a network backend (e.g., server). In an alternate embodiment, the classification subsystem 201 and/or signature generation subsystem 203 can be pushed to the client side of a computer network alongside an existing antivirus system. In either case, SMSG 113 provides a fully automated response to evolving malware threats. It should be appreciated that, in addition to the malware signature updates discussed above, in one embodiment, rules can be frequently updated to optimize system readiness to respond to a malware attack.

Figure 3:
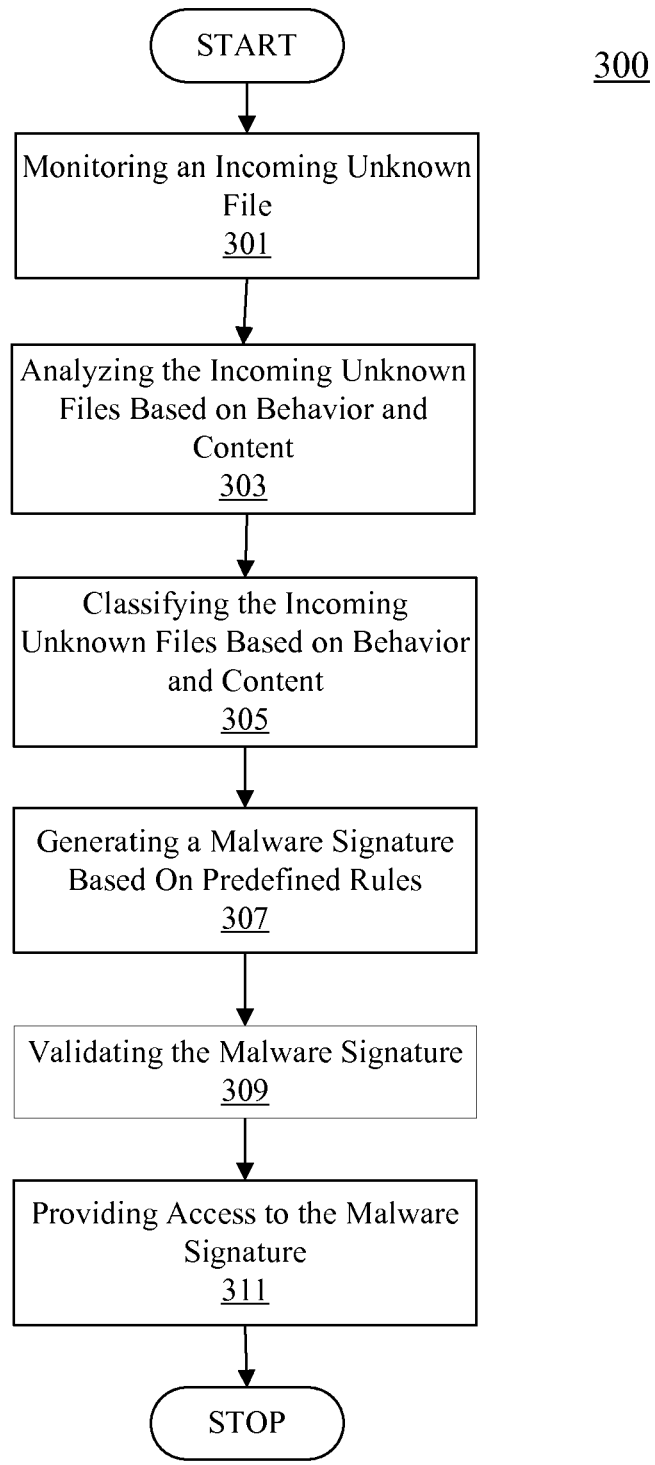
FIG. 3 shows a flowchart of the steps performed in a method for automated malware signature generation according to one embodiment.

Exemplary Operations of Automated Malware
Signature Generation According to Embodiments FIG. 3 shows a flowchart 300 of the steps performed in a method for automated malware signature generation according to one embodiment. The flowchart includes processes that, in one embodiment can be carried out by processors and electrical components under the control of computer-readable and computer-executable instructions. Although specific steps are disclosed in the flowcharts, such steps are exemplary. That is embodiments are well suited to performing various other steps or variations of the steps recited in the flowcharts. Within various embodiments, it should be appreciated that the steps of the flowcharts can be performed by software, by hardware or by a combination of both.

Referring to FIG. 3, at step 301, incoming unknown files are monitored. In one embodiment, an incoming unknown file monitor (e.g., 201 in FIG. 2A) monitors a client system's (e.g., 101 in FIG. 1A) incoming unknown files for the presence of malware. In one embodiment, incoming unknown files can be accessed from locally coupled and/or network coupled sources. In one embodiment, upon the detection of incoming unknown files the detected incoming unknown files can be accessed by an incoming unknown file analyzer (e.g., 203 in FIG. 2A).

At step 303, incoming unknown files are analyzed based on behavior and content. In one embodiment, an incoming unknown file analyzer (e.g., 203 in FIG. 2A) can be used to generate data related to both file behavior and file content. In one embodiment, the incoming unknown file analyzer (e.g., 203 in FIG. 2A) subjects incoming unknown files to a plurality of types of analysis and generates data related to both file behavior and content that can be used by an incoming unknown file classifier (e.g., 205 in FIG. 2A) to provide a highly reliable classification that is based on a multidimensional analysis of incoming unknown files.

At step 305, incoming unknown files are classified. In one embodiment, an incoming unknown file classifier (e.g., 205 in FIG. 2A) can be used to identify an incoming file as having a particular malware classification. In one embodiment, the identification is based on a correlation of the aforementioned analysis in accordance with predefined rules. In one embodiment, unknown file classifier (e.g., 205 in FIG. 2A) can encompass a rule based algorithm that receives as input data generated from the aforementioned analysis of incoming unknown files and provides as an output a highly reliable classification that is based on a multidimensional analysis of incoming unknown files.

At step 307, a malware signature is generated based on the classification of the unknown file that is made at step 305 in accordance with predefined signature generation rules. In one embodiment, a malware signature generator (e.g., 207 in FIG. 2A) can be used to generate a malware signature for the aforementioned incoming unknown files identified as including malware. In one embodiment, the malware signature generator 207 (e.g., 207 in FIG. 2A) can generate the malware signature using signature extraction or other signature generating techniques.

In one embodiment, the type of signature that is extracted from a malware file can be based on malware type and/or family. In addition, the signature can be based on rules that are specified beforehand for the type of signature to be generated. In one embodiment, a signature generator can generate one or more signatures for a given malware file (see discussion of the signature generator made herein with reference to FIG. 2B).

At step 309, the malware signature generated at step 307 is validated. In one embodiment, a malware signature validator (e.g., 209 in FIG. 2A) can be used to validate the generated malware signature. In one embodiment, the malware signature validator (e.g., 209 in FIG. 2A) can validate generated malware signatures before access is provided to the generated malware. In one embodiment, the malware signature is validated to avoid false positives when the malware signature is later used in the identification of malware. In one embodiment, information can be accessed (such as from databases) and used to validate a generated malware signature before the signature is provided to an antivirus program (e.g., 103 in FIG. 1A).

At step 311, access is provided to the malware signature that is generated at step 309. In one embodiment, an access provider (e.g., 211 in FIG. 2A) can be used to provide access to the generated malware signature. In one embodiment, access is provided by transmitting the malware signature to a client system (e.g., 101 in FIG. 1A). In another embodiment, access is provided by allowing the malware signature to be retrieved.

With reference to exemplary embodiments thereof, automated malware signature generation is disclosed. Automated malware signature generation includes monitoring incoming unknown files for the presence of malware and analyzing the incoming unknown files based on both a plurality of classifiers of file behavior and a plurality of classifiers of file content. An incoming file is classified as having a particular malware classification based on the analyzing of incoming unknown files and a malware signature is generated for the incoming unknown file based on the particular malware classification. Access is provided to the malware signature.

The foregoing descriptions of specific embodiments have been presented for purposes of illustration and description. They are not intended to be exhaustive or to limit the subject matter to the precise forms disclosed, and obviously many modifications and variations are possible in light of the above teaching. The embodiments were chosen and described in order to best explain the principles of the disclosed subject matter and its practical application, to thereby enable others skilled in the art to best utilize the disclosed subject matter and various embodiments with various modifications as are suited to the particular use contemplated. It is intended that the scope of the disclosed subject matter be defined by the Claims appended hereto and their equivalents.

What is claimed is:

1. A method, comprising:
monitoring a system to detect an unknown file;
disassembling the unknown file to obtain one or more disassembled functions, each of the one or more disassembled functions comprising a block of assembly code that is configured to be referenced by one or more instructions;
determining, via a processing unit, a function characteristic value for each of the one or more disassembled functions;
determining a plurality of weight values for each one of the one or more disassembled functions based on at least the function characteristic value(s), each of the weight values for a given disassembled function indicating a reliability that the given disassembled function is an identifier of a different malware family in a plurality of known malware families;
characterizing the unknown file as belonging to a particular one of the plurality of known malware families based on at least the weight values;
based on the characterization of the unknown file as belonging to the particular one of the known malware families, automatically generating a signature for the unknown file; and
providing access to the signature to an antivirus program for use in detecting malware.

2. The method of claim 1, wherein each function characteristic value is useable to query a function semantics database.

3. The method of claim 2, the function semantics database comprising one or more function entries, each function entry in the one or more function entries being associated with a respective one of the one or more disassembled functions.

4. The method of claim 1, wherein the characterizing the unknown file as belonging to a particular one of the plurality of known malware families based on at least the weight values comprises:

calculating a score for each malware family in the plurality of known malware families based on the weight values associated with each disassembled function for the respective malware family.

5. The method of claim 4, wherein the characterizing the unknown file as belonging to a particular one of the plurality of known malware families based on at least the weight values further comprises:
identifying the malware family with the top score as the malware family to which the unknown file has the greatest probability of belonging.

6. The method of claim 1, wherein the determining the function characteristic value comprises calculating a hash value.

7. The method of claim 1, wherein the determining the function characteristic value comprises creating an opcode that specifies an operation to be performed for each instruction of each of the one or more disassembled functions.

8. The method of claim 1, wherein the determining the function characteristic value comprises zeroing out external information that is not relevant to an operation while retaining other function information.

9. A computer readable storage medium, excluding signals, comprising instructions that when executed via a processing unit perform a method comprising:
monitoring a system to detect an unknown file;
disassembling the unknown file to obtain one or more disassembled functions, each of the one or more disassembled functions comprising a block of assembly code that is configured to be referenced by one or more instructions;
determining, via the processing unit, a function characteristic value for each of the one or more disassembled functions;
determining a plurality of weight values for each one of the one or more disassembled functions based on at least the function characteristic value(s), each of the weight values for a given disassembled function indicating a reliability that the given disassembled function is an identifier of each known a different malware family in a plurality of known malware families;
characterizing the unknown file as belonging to a particular one of the plurality of known malware families based at least on the weight values;
based on the characterization of the unknown file as belonging to the particular one of the known malware families, automatically generating a signature for the unknown file; and
providing access to the signature to an antivirus program for use in detecting malware.

10. The computer readable storage medium of claim 9, wherein each function characteristic value is useable to query a function semantic database.

11. The computer readable storage medium of claim 10, wherein the function semantics database comprises one or more function entries, each function entry in the one or more function entries being associated with a respective one of the one or more disassembled functions.

12. The computer readable storage medium of claim 9, wherein the characterizing the unknown file as belonging to a particular one of the plurality of known malware families based on at least the weight values comprises calculating a score for each malware family in the plurality of known malware families based on the weight values associated with each disassembled function for the respective malware family.

13. The computer readable storage medium of claim 12, wherein the characterizing the unknown file as belonging to a particular one of the plurality of known malware families based on at least the weight values further comprises:
identifying the malware family with the top score as the malware family to which the unknown file has the greatest probability of belonging.

14. The computer readable storage medium of claim 9, wherein the determining the function characteristic value comprises calculating a hash value.

15. A system, comprising:
a processing unit;
a memory that stores software for execution by the processing unit, the software comprising:
an incoming unknown file monitor configured to monitor a system to detect an unknown file;
an incoming unknown file analyzer configured to, via a processing unit,
disassemble the unknown file to obtain one or more disassembled functions, each of the one or more disassembled functions comprising a block of assembly code that is configured to be referenced by one or more instructions, and
determine a function characteristic value for each of the one or more disassembled functions;
determine a plurality of weight values for each one of the one or more disassembled functions based on at least the function characteristic value(s), each of the weight values for a given disassembled function indicating a reliability that the given disassembled function is an identifier of a different malware family in a plurality of known malware families;
an incoming unknown file classifier configured to characterize the unknown file as belonging to a particular one of the plurality of known malware families based on the weight values;
a malware signature generator configured to, based on the characterization of the unknown file as belonging to the particular one of the known malware families, automatically generate a signature for the unknown file; and
an access provider configured to provide access to the signature to an antivirus program for use in detecting malware.

16. The system of claim 15, wherein each function characteristic value is useable to query a function semantics database.

17. The system of claim 16, wherein the function semantics database comprises one or more function entries, each function entry in the one or more function entries being associated with a respective one of the one or more disassembled functions.

18. The system of claim 15, wherein the incoming unknown file analyzer is further configured to characterize the unknown file as belonging to a particular one of the plurality of known malware families based on at least the weight values by calculating a score for each malware family in the plurality of known malware families based on the weight values associated with each disassembled function for the respective malware family.

19. The system of claim 18, wherein the incoming unknown file classifier is further configured to characterize the unknown file as belonging to a particular one of the plurality of known malware families based on at least the weighted values by identifying the malware family with the top score as the malware family to which the unknown file has the greatest probability of belonging.

20. The system of claim 15, wherein the incoming unknown file analyzer is configured to determine a function characteristic value by calculating a hash value.

* * * * *